United States Patent [19]

Clarke

[11] Patent Number: 5,131,922
[45] Date of Patent: Jul. 21, 1992

[54] PROCESS FOR THE PRODUCTION OF OXIDIZED POLYISOBUTENES, THEIR USE IN THE PRODUCTION OF ADDITIVES AND USE OF THE ADDITIVES

[75] Inventor: Michael J. Clarke, Hull, England

[73] Assignee: BP Chemicals (Additives) Limited, London, England

[21] Appl. No.: 772,153

[22] Filed: Oct. 7, 1991

Related U.S. Application Data

[62] Division of Ser. No. 692,226, Apr. 26, 1991, Pat. No. 5,086,115, which is a division of Ser. No. 216,634, filed as PCT/GB87/00846, Nov. 27, 1987.

[30] Foreign Application Priority Data

Nov. 27, 1986 [GB] United Kingdom ............... 8628339

[51] Int. Cl.$^5$ .............................................. C10C 1/08
[52] U.S. Cl. ...................................... 44/447; 252/54; 525/157; 525/164; 525/381; 525/382
[58] Field of Search ............................. 44/447; 252/54; 525/157, 164, 381, 382

[56] References Cited

U.S. PATENT DOCUMENTS 3,931,074  1/1976  Hu ............................. 252/51.5 R
4,011,380  3/1977  West et al. ..................... 526/30

FOREIGN PATENT DOCUMENTS 0050524  4/1982  European Pat. Off. .
954362   6/1964  United Kingdom .

Primary Examiner—Bernard Lipman
Attorney, Agent, or Firm—Brooks Haidt Haffner & Delahunty

[57] ABSTRACT

Oxidized polyisobutenes, that is polyisobutenes containing ketonic and carboxylic acid carbonyl groups, are produced by passing through a column of the polyisobutene maintained at a temperature in the range from 140° to 200° C. and at atmospheric or elevated total pressure a molecular oxygen-containing gaseous oxidant at a gas flow rate greater than 10 liters $cm^{-2}h^{-1}$ measured at the operating pressure. The oxidized polyisobutenes can be reacted for example with an aliphatic polyamine to produce a lubricating oil additive or with an aliphatic polyamide and formaldehyde to produce a fuels additive.

2 Claims, 1 Drawing Sheet

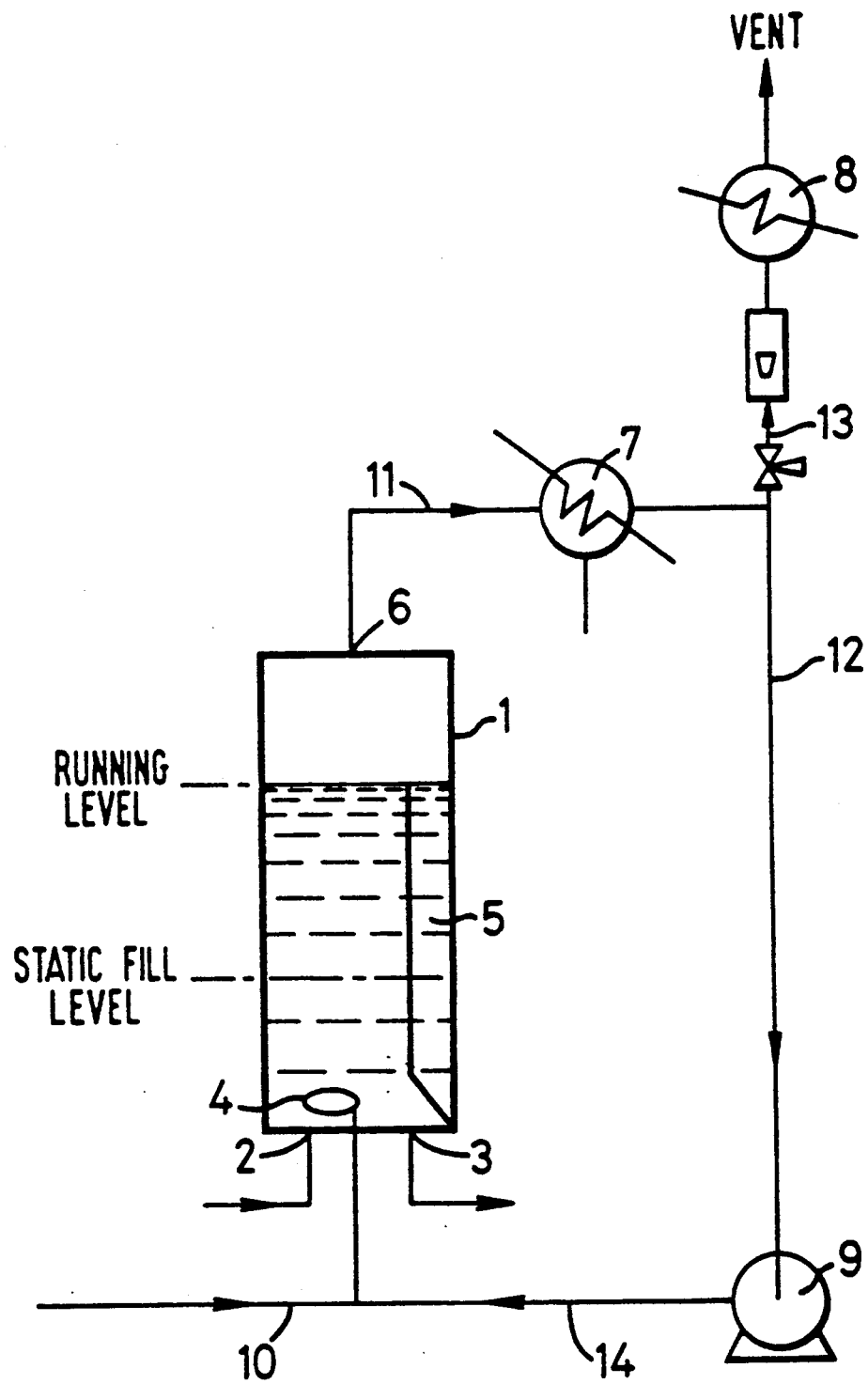

PROCESS FOR THE PRODUCTION OF OXIDIZED POLYISOBUTENES, THEIR USE IN THE PRODUCTION OF ADDITIVES AND USE OF THE ADDITIVES

This is a division of application Ser. No. 07/692,226, filed Apr. 26, 1991, now U.S. Pat. No. 5,086,115, which in turn is a division of application Ser. No. 07/216,634, filed as PCT/GB87/00846, Nov. 27, 1987, now U.S. Pat. No. 5,028,666.

The present invention relates to an improved process for the production of oxidised polyisobutenes, to the production of lubricating oil and fuel additives therefrom and to the uses thereof.

Oxidised polyisobutenes, that is polyisobutenes having oxygen chemically bound thereto principally in the form of keto-carbonyl groups, are potentially valuable industrial products because they are readily convertible by reaction with amines into materials useful as lubricating oil additives, for example as dispersants and detergents.

The oxidation and subsequent ammination of polyisobutylenes has been described in the patent literature in, for example, U.S. Pat. No. 3,931,024.

U.S. Pat. No. 3,931,024 discloses that a highly effective dispersant for a lubricating oil or a fuel can be prepared by the noncatalysed air-oxidation of a polyolefin or of a halogenated polyolefin to form an oxygen-containing material. This material is then reacted with an aliphatic polyamine under conditions that cause the formation of an addition product which differs chemically from the Schiff bases of the prior art. The oxidation of the polymer is conducted by contacting the polymer with air at a temperature in the range of from about 120° to about 250° C., more usually at a temperature in the range from about 150° C. to about 220° C. The lower temperatures tend to favour more unsaturation in the product. Excessively high temperatures are generally to be avoided so as to minimise degradation. Atmospheric pressure or somewhat elevated pressures can be used, the latter favouring the mass transfer rate. Efficient agitation is also helpful in increasing the rate. In Example 1 of U.S. Pat. No. 3,931,024 a quantity of polyisobutene of about 980 average molecular weight was oxidised by blowing air through the polymer at 170° C. for 25 hours, no catalyst being used. More specifically, 1640 g of the polymer was thus oxidised using a stream of air at the rate of 1 liter of air per minute measured at standard conditions. The oxidised polymer was found to contain 4.3 weight percent of oxygen. No further details of the oxidation process are given.

In our experience, it is possible to successfully produce oxidised polyisobutenes in stirred pots on a laboratory scale, but scale-up has proved impossible. This failure to scale-up we now believe is due to the difficulty involved in developing sufficient shear in a large stirred pot reactor. For example it has been calculated from our results that an 80 cm diameter reactor with an 80 cm fill height and a 6 blade flat agitator would require a minimum of a 60 kilowatt stirrer.

In GB-A-959362 there is described the oxidation of polyethylene waxes in vessels of 10 liter and 100 liter capacity. In order to achieve an acceptable shear rate a very high agitator power input is employed.

It is clear from the foregoing that for commercial scale operation a different approach is required. We have now found that polyisobutenes can be successfully oxidised in a manner capable of use on a commercial scale by passing through a column of polyisobutene a molecular oxygen-containing gaseous oxidant at high gas flow rates per unit cross-sectional area. In this manner high shear of the polyisobutene can be achieved.

Accordingly, the present invention provides a process for the production of an oxidised polyisobutene which process comprises passing through a column of the polyisobutene maintained at a temperature in the range from 140° to 200° C. and at atmospheric or elevated total pressure a molecular oxygen-containing gaseous oxidant at a gas flow rate greater than 10 liters $cm^{-2}h^{-1}$ measured at the operating pressure.

As the molecular weight of polyisobutenes increases, their physical form changes from mobile liquids, through viscous liquids to rubbery solids. Suitably the polyisobutene may be one having a number average molecular weight in the range from about 900 to about 10,000, though higher molecular weight polyisobutenes may be used if desired. Low molecular weight polyisobutenes are mobile liquids and may therefore be used in the absence of a solvent. However, it may nevertheless be desirable to use a low molecular weight polyisobutene dissolved in a suitable solvent and for higher molecular weight polybutenes the use of a solution in a suitable solvent is essential. Suitable solvents are those which dissolve the polybutene and are not detrimentally oxidised or otherwise chemically attacked under the process conditions. Suitable solvents include hydrocarbon liquids which may be aliphatic or aromatic, for example a base oil, typically a solvent neutral oil, a low molecular weight polyisobutene, liquid paraffins, benzene, a chlorinated benzene, and the like.

The column of polyisobutene may suitably be contained within a tubular reactor. A preferred form of tubular reactor is a draft tube reactor, i.e. a reactor which comprises a closed vessel having at least one inlet and at least one outlet, a partition dividing the vessel into two zones which intercommunicate above and below the partition and means for admitting gas in a finely divided state into the lower part of one of the zones. The use of a draft tube reactor facilitates good mixing, a feature identified as being desirable on scale-up, by returning material from the top of the reactor to the base. Another feature, identified as being relevant to the achievement of optimum results, is the height of the liquid column. Desirably, the static height of the liquid column, that is the height of the liquid column in the non-operative mode, should be greater than 30 cm, irrespective of the cross-sectional area of the column.

An important parameter is the temperature of the polyisobutene. Oxidation does not occur at an appreciable rate at temperatures much below 140° C. and at temperatures above 200° C. the polyisobutene tends to 'crack' to lower molecular weight hydrocarbons at an appreciable rate. The polyisobutene is preferably maintained at a temperature in the range from 150° to 190° C., even more preferably at about 180° C.

The molecular oxygen-containing gaseous oxidant should be of a composition such as to remain outside the explosive limits of any light hydrocarbons formed during the oxidation. A suitable gaseous oxidant for this purpose is oxygen diluted with inert gas, for example nitrogen. Preferably in such a mixture the oxygen concentration is in the range from 2 to 20% by volume, more preferably about 10% by volume. Air or other molecular oxygen-containing gases may also be used, subject to the aforementioned proviso. It is preferred to recycle the gaseous oxidant after passage through the polyisobutene since only a small proportion of the available oxygen is absorbed per pass through the column of reactant.

The molecular oxygen-containing gas is preferably passed through the column of polyisobutene at a gas flow rate greater than 20, more preferably greater than 40 liters $cm^{-2}h^{-1}$.

Although the process may be operated at atmoshperic pressure it is preferred to operate at elevated gaseous total pressures in order to compensate for low molecular oxygen concentrations. Suitably oxygen partial pressures up to 1.5 bar at total pressures up to 15 bar may be employed, though higher pressures may be used.

The process may be operated batchwise or continuously, preferably continuously.

The product of oxidising a polyisobutene by the aforedescribed process is a polyisobutene with a subtantial chemically bound oxygen content, the oxygen being incorporated principally in the form of keto carbonyl or carboxylic acid groups.

The oxidised product is a useful chemical intermediate which may be further reacted to produce materials useful as lubricating oil and fuel additives, as well as adhesives and fillers.

In a further embodiment therefore the present invention provides a process for the production of a product suitable for use as a lubricating oil additive which process comprises reacting an oxidised polyisobutene produced by the process as hereinbefore described with an aliphatic polyamine employing a mole ratio of polyamine to oxidised polyisobutene of from about 0.2 to about 2.5 moles of polyamine per mole of the oxidised polyisobutene.

Further details of this process may be found in the aforesaid U.S. Pat. No. 3,931,024, the disclosure of which is incorporated herein by reference.

The invention also provides a finished lubricating oil composition comprising a major proportion of a lubricating oil and a minor proportion of a lubricating oil additive prepared by the process as hereinbefore described.

The lubricating oil may suitably be any oil of lubricating viscosity and may be either natural or synthetic.

In a preferred embodiment the invention also provides a process for the production of a product suitable for use as a fuel additive for inlet manifold and carburettor detergency which process comprises reacting an oxidised polyisobutene produced by the process as hereinbefore described with an aliphatic polyamine, preferably an alkylene polyamine, and formaldehyde or a precursor thereof.

The aliphatic polyamine is preferably an alkylene polyamine having the general formula:

wherein n is from 2 to 4 and m is a number from 0 to 10. Specific compounds falling within the aforesaid formula include ethylene diamine, diethylene triamine, triethylene tetramine, tetraethylene pentamine, propylene diamine, dipropylenediamine, and the like. A preferred alkylene polyamine is diethylene triamine.

With the aliphatic polyamine there can be reacted either formaldehyde itself or a formaldehyde precursor, for example formalin, paraformaldehyde, other linear and cyclic formaldehyde polymers and gaseous formaldehyde.

Conditions under which the reaction may be effected are well known in the art and require no further elaboration to a person skilled in the art.

In a further embodiment the invention also provides a fuel composition comprising a major proportion of a fuel and a minor proportion of the fuel additive prepared by the process as hereinbefore described.

The fuel may suitably be an internal combustion engine fuel. A preferred fuel is one suitable for use in spark ignition engines, for example a motor gasoline. Alternatively, the fuel may be a fuel suitable for use in spark compression engines, for example a diesel fuel.

A preferred embodiment of the invention will now be described with reference to the accompanying FIGURE which takes the form of a flow sheet.

With reference to the FIGURE, 1 is a draft tube reactor having an inlet 2 for entry of liquid polyisobutene (PIB) an outlet 3 for discharge of oxidised PIB, a sparge plate 4, a draft tube 5 and an outlet for gaseous materials 6, 7 and 8 are condensers and 9 is a centrifugal blower, 10 to 14 are connecting lines.

To the draft tube reactor 1 charged through inlet 2 to about a third its height with the polyisobutene to be oxidised and maintained at the desired temperature (heating means and controls not shown) is fed through the sparge plate 4 gaseous oxidant at a gas flow rate greater than 10, preferably greater than 20, more preferably greater than 40 liters $cm^{-2}h^{-1}$ in the form of fine bubbles. The gaseous oxidant is composed of air make up fed through line 10 plus bleed to vent (based on PIB charge) and through line 14 recirculated oxidant controlled at 10% oxygen in nitrogen.

In passing upwards through the column of PIB the gaseous oxidant causes the PIB level to rise to about two thirds the height of the reactor and produces a density differential resulting in circulation of the PIB through the draft tube, thereby causing mixing.

Through the reactor exit 6 emerges a gaseous mixture comprising nitrogen, unreacted oxygen and hydrocarbons. This is passed through line 11 to the condenser 7 in which condensate comprising light hydrocarbons and PIB is separated from $O_2$ and $N_2$. A part of the $O_2/N_2$ mixture is rcirculated through lines 12 and 14 through the centrifugal blower 9. Another part is taken through line 13 by way of a flow regulator and a condenser 8 to vent.

Oxidised PIB is recovered through outlet 3.

EXAMPLE 1

The flow scheme shown in the Figure was employed except that items 2, 3, 5, 9, 12 and 14 were omitted. The process was operated on a once-through basis, i.e. batchwise.

The reactor 1 was charged to a third its height with polyisobutene (Hyvis (RTM) 30, ex BP Chemicals Limited, having a number average molecular weight of 1350) (approximately 4 liter) and maintained at 180° C. (heating means and controls not shown). Gaseous oxidant consisting of 10% oxygen in nitrogen was fed through the sparge plate 4 at a gas flow rate of 45 liters $cm^{-2}h^{-1}$ in the form of fine bubbles. The total partial pressure in the reactor was 6.9 barg (100 psig).

A sample of the oxidised polyisobutene was withdrawn from the reactor after 1 hour through the outlet 3.

The increase in the carbonyl content of the oxidised PIB was observed by measurement of the i.r. absorbance at 1720 cm$^{-1}$, and the total oxygen content was measured by a microanalytical technique.

The results are given in Table 1.

EXAMPLE 2

The precedure of Example 1 was repeated except that the sample was withdrawn after 4 hours operation.

The results are given in Table 1.

TABLE 1

| Example | i.r. Absorbance (peak height mm) | Total O$_2$ Content (%) | Mol. Ratio PIB/O$_2$ |
|---|---|---|---|
| Starting PIB | 3 | 0.04 | 0.0 |
| 1 | 15 | 0.99 | 0.8 |
| 2 | 48 | 3.52 | 2.9 |

EXAMPLE 3

In a small scale glass laboratory reactor the initial oxygen absorption rate was determined at several different air flowrates per unit cross sectional area (csa) of the reactor for a fixed height of polyisobutene in the reactor.

The results are given in the following Table.

TABLE

| Initial rate (mol O$_2$ absorbed/mol polyisobutene/hour) | Airflow rate per unit csa (liters cm$^{-2}$h$^{-1}$) |
|---|---|
| 0 | 0 |
| 0.175 | 20 |
| 0.235 | 34 |
| 0.250 | 45 |

EXAMPLE 4

Oxidised PIB amination

4% w/w diethylene triamine was added to a PIB oxidate and the mixture heated for 2 hours at 160°–180° C. The mixture was then cooled to approximately 100° C. To the cooled mixture was added 3% w/w of a 38% solution of formaldehyde in water and the mixture was then heated to 180° C. for 1 hour. It was then vacuum stripped at 180° C. to about 10 torr, cooled and discharged.

The analytical results are shown in Table 2.

TABLE 2

| Oxidate Sample | Basic Nitrogen (% w/w) | Total Nitrogen (% w/w) | Viscosity at 100° C. (cSt) |
|---|---|---|---|
| 1 hour oxidate | NA | 0.45 | NA |
| 4 hour oxidate | 0.67 | 0.98 | 722 |

The aminated product produced from the 4 hour oxidate was used at a treatment level of 500 ppm in petrol and subjected to a comparative Opel Kadett carburettor test. This material compared favourably with a commercial carburettor detergent.

Comparison Test

For the test a 200 liter acid-resistant steel 'pot' reactor equipped with thermostatically controlled electrical heating was used. It was fitted with a propellor stirrer with provision for introducing gas into the fluid stream just upstream of the propellor. The air inlet was fitted with a gas flow meter capable of measuring up to 50 l of air/minute and a continuous oxygen meter was installed in the exhaust line, which was vented to the outside atmosphere.

The reactor was charged with 100 kg of a polyisobutene of molecular weight 1300 and finely ground potassium carbonate (500 g) as catalyst. Air was then introduced beginning at a very low rate, the intention being to find the maximum permissible air rate when the oxygen content of the exhaust for safety reasons was not permitted to exceed 5% vol. The rate of air-blowing was increased but never achieved a value approaching 10 liters cm$^{-2}$h$^{-1}$.

After an induction period of a few minutes, the oxidation proceeded very rapidly. The oxygen content of the exhaust gas never increased above a few percent volume.

After 16 hours reaction time little polyisobutene oxidation had occurred, although oxygen consumption was high. This was due to the formation of low boiling (and low flash point) oxygenates.

The oxidation was continued for at least 50 hours and gave a product of almost the desired carbonyl content. However, the product was of an undesirable colour and, more importantly, gave a lubricating oil and kerosene-insoluble product when reacted with amines.

This is not an example according to the present invention because the air flow rate was less than 10 liters cm$^{-2}$h$^{-1}$ and is included only for the purpose of demonstrating that large-scale operation in a stirred pot reactor at low oxidant gas flow rates, i.e. less than 10 l cm$^{-2}$h$^{-1}$, does not produce oxidised polybutenes of a type desirable for further processing into lubricating oil and fuel additives.

I claim:

1. A finished lubricating oil composition comprising a major preparation of a lubricating oil and a minor proportion of a lubricating oil additive prepared by a process which comprises passing through a column of polyisobutene maintained at a temperature in the range from 140° to 200° C. and at atmospheric or elevated pressure a molecular oxygen-containing gaseous oxidant at a gas flow rate greater than 10 liters cm$^{-2}$h$^{-1}$ measured at the operating pressure to obtain an oxidized polyisobutene and then reacting the oxidized polyisobutene with an aliphatic polyamine employing a mole ratio of polyamine to oxidized polyisobutene of from about 0.2 to about 2.5 moles of polyamine per mole of the oxidized polyisobutylene.

2. A fuel composition comprising a major proportion of a fuel and a minor proportion of a product produced by a process which comprises passing through a column of polyisobutene maintained at a temperature in the range from 140° to 200° C. and at atmospheric or elevated pressure a molecular oxygen-containing gaseous oxidant at a gas flow rate greater than 10 liters cm$^{-2}$h$^{-1}$ measured at the operating pressure to obtain an oxidized polyisobutene and then reacting the oxidized polyisobutene with an aliphatic polyamine employing a mole ratio of polyamine to oxidized polyisobutene of from about 0.2 to about 2.5 moles of polyamine per mole of the oxidized polyisobutylene.

* * * * *

UNITED STATES PATENT AND TRADEMARK OFFICE
CERTIFICATE OF CORRECTION

PATENT NO. : 5,131,922
DATED : July 21, 1992
INVENTOR(S) : MICHAEL J. CLARKE

It is certified that error appears in the above-identified patent and that said Letters Patent is hereby corrected as shown below:

In the Abstract at the second to last line correct the spelling of the word "polyami<u>n</u>e"

Col. 3, l. 9, correct the spelling of the word "atmos<u>p</u>heric"

Col. 4, l. 46, correct the spelling of the word "r<u>e</u>circulated"

Signed and Sealed this

Seventh Day of September, 1993

Attest:

BRUCE LEHMAN

*Attesting Officer*    *Commissioner of Patents and Trademarks*